United States Patent [19]

Kellner

[11] 4,102,552

[45] Jul. 25, 1978

[54] TANDEM ECCENTRIC ROLLER STABILIZER FOR EARTH BORING APPARATUS

[75] Inventor: Jackson M. Kellner, Midland, Tex.

[73] Assignee: Smith International, Inc., Midland, Tex.

[21] Appl. No.: 721,089

[22] Filed: Sep. 7, 1976

[51] Int. Cl.$^2$ .................. F16C 17/00; F16C 19/00
[52] U.S. Cl. .................... 308/4 A; 166/241; 175/325; 308/8.2
[58] Field of Search ............ 308/4 R, 4 A, 8.2, 6 A; 175/76, 325, 406, 408, 73; 166/241

[56] References Cited

U.S. PATENT DOCUMENTS

| | | | |
|---|---|---|---|
| 1,776,611 | 9/1930 | Akeyson | 175/406 |
| 1,788,630 | 1/1931 | Grant | 308/4 A |
| 2,167,194 | 7/1939 | Anderson | 175/325 |
| 3,400,773 | 9/1968 | Tiraspolsky et al. | 175/325 |
| 3,413,045 | 11/1968 | Wohlfeld | 308/6 |
| 3,463,270 | 8/1969 | Lundstrom et al. | 308/8.2 |
| 3,754,609 | 8/1973 | Garrett | 175/325 |
| 3,982,594 | 9/1976 | Berthiaume | 308/8.2 |

Primary Examiner—Trygve M. Blix
Assistant Examiner—Charles E. Frankfort
Attorney, Agent, or Firm—Murray Robinson; Ned L. Conley; David Alan Rose

[57] ABSTRACT

The eccentric journals of a tandem roller stabilizer are azimuthally positioned relative to each other by a single thread on the mandrel onto which the journals of the successive roller assemblies are screwed, the journal of each roller assembly having a like thread and together with its end plates having a length adapted to encompass a portion of the mandrel thread having a length of (n)(360) + x degrees where n is an integer and x is the desired azimuthal displacement of each roller assembly journal from the adjacent journals. Preferably x is equal to (360)/(r) degrees where r is the number of roller assemblies on the stabilizer, so that the points of stabilizer contact with the bore hole are spaced uniformly all around the stabilizer axis. The bearings supporting the rollers on the journals may be bushed only on the loaded side and be unsealed, being cooled with air bled from the stabilizer mandrel and exhausted through the bearings. Other forms of bearings can be used, e.g. a sealed antifriction bearing employing rollers for radial load and balls for axial thrust, with O rings sealing between the rollers and end plates secured to the journals. In another embodiment, full sleeve bushings take both radial load and end thrust.

32 Claims, 10 Drawing Figures

TANDEM ECCENTRIC ROLLER STABILIZER FOR EARTH BORING APPARATUS

CROSS REFERENCE TO RELATED APPLICATIONS:

The invention herein disclosed is an improvement upon the invention disclosed in a United States patent application by Jerry Olympus Young entitled Stabilizer, filed Sept. 7, 1976, Ser. No. 720,954, now U.S. Pat. No. 4,080,010 assigned to the same assignee as the present application, which was an improvement upon the prior invention disclosed in my United States application entitled Stabilizer, Ser. No. 720,695, filed Sept. 7, 1976, now U.S. Pat. No. 4,071,285 assigned to the same assignee as the present invention, upon which latter invention my application entitled Stabilizer, Ser. No. 721,090, filed Sept. 7, 1976, now U.S. Pat. No. 4,082,373, assigned to the same assignee as the present application discloses a further improvement.

BACKGROUND OF THE INVENTION

This invention relates to earth boring apparatus and more particularly to roller stabilizers useful in the rotary system of boring blast holes.

Difficulty has been experienced with stabilizers of the type employing plural colevel rollers mounted on parallel off-axial journals when the hole size is increased, e.g., up to 15 or more inches in diameter. Larger bearing diameters are needed to accommodate the large lateral loads without undue wear. A similar problem arises with roller reamers, which are similar to roller stabilizers, the latter being undergage while reamers are full gage. A solution to the problem is the employment of tandem rollers mounted on eccentric journals extending around the stabilizer mandrel. Such construction is already known, e.g. for roller reamers, as shown in U.S. Pat. No. 3,400,773 to TIRAPOLSKY et al. See also U.S. Pat. No. 1,772,491 to Koppl.

With tandem rollers it is necessary to orient the eccentric journals azimuthally relative to each other in order to distribute the lateral loading uniformly about the axis of the stabilizer mandrel. Otherwise the rollers would cause the mandrel to deflect and reduce the effectiveness of the stabilizer. In this regard Tirapolsky, referring to the elements on which the rollers rotate as hubs, states:

"A suitable assembly can be obtained by connecting the hubs of the consecutive reaming elements by coupling rings in which the hubs are screwed but it is very difficult in this way to obtain a correct relative angular positioning of the axes of the hubs around the axis of the body of the remaining tool.

Another solution is the use of a shaft for the reaming tool on which eccentric hubs are mounted and the rollers turn on these hubs on axes parallel to the shaft with the hubs being fastened to the shaft for rotation either by keying on the shaft or by utilization of a shaft having a polygonal section.

Any of the solutions discussed above require a shaft having a cross-section sufficient to transmit large forces of rotation to the reaming elements.

An object of the present invention is to provide a rigid assembly of reaming elements in which the transmission of the torque to these reaming elements is provided by the assembly itself which is solidly and directly connected to the driving shaft of the bottom motor which drives the tool in rotation."

Tirapolsky employs rings between his hubs, the rings having eccentric sockets to receive and position the hubs, which are largely out of contact with the mandrel.

Koppl employs a polygonal section shaft, as mentioned by Tirapolsky.

SUMMARY OF THE INVENTION

According to the invention the eccentric journals of a tandem roller stabilizer are azimuthally positioned relative to each other by a single thread on the mandrel onto which the journals of the successive roller assemblies are screwed, the journal of each roller assembly having a like thread and together with its end plates having a length adapted to encompass a portion of the mandrel thread having a length of $(n)(360) + x°$ where $n$ is an integer and $x$ is the desired azimuthal displacement of each roller assembly journal from the adjacent journals. Preferably $x$ is equal to $(360)/(r)°$ where $r$ is the number of roller assemblies on the stabilizer, so that the points of stabilizer contact with the bore hole are spaced uniformly all around the stabilizer axis. The bearings supporting the rollers on the journals may be bushed only on the loaded side and be unsealed, being cooled with air bled from the stabilizer mandrel and exhausted through the bearings. Other forms of bearings can be used, e.g. a sealed antifriction bearing employing rollers for radial load and balls for axial thrust, with O rings sealing between the rollers and end plates secured to the journals. In another embodiment, full sleeve bushings take both radial load and end thrust.

BRIEF DESCRIPTION OF THE DRAWINGS

For a more detailed description of preferred embodiments of the invention reference will now be made to the accompanying drawings wherein.

DESCRIPTION OF PREFERRED EMBODIMENT

Stabilizer Assembly

Figure 1:
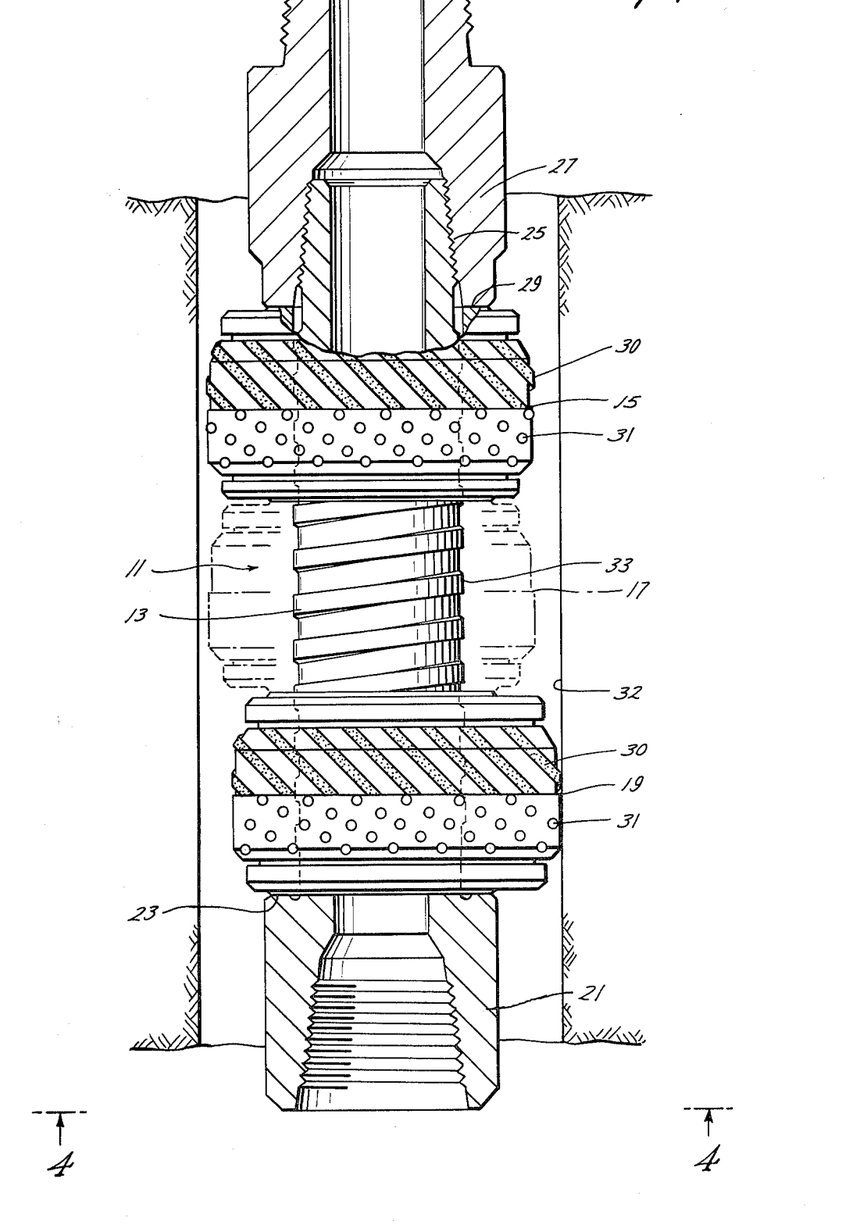
FIG. 1 is a side elevation of a stabilizer embodying the invention, one of the roller assemblies being shown only in phantom in order to expose the mandrel.

Referring now to FIG. 1 there is shown a stabilizer comprising tubular body 11 including mandrel portion 13. The mandrel has a single lead thread 33 on its outer periphery on to which are screwed the roller assemblies 15, 17, 19. Adjacent one end of the mandrel the body is provided with an internally taper threaded box 21 for making a rotary shouldered connection with an adjacent drill string member, e.g. a bit. For a more detailed disclosure of rotary shouldered connections see U.S. Pat. No. 3,754,609 to Garrett.

A shoulder 23 is formed at the juncture of the box 21 and the mandrel 13, providing stop means at one end of the mandrel limiting axial motion of the roller assemblies relative to the mandrel in the direction toward the box 21. At the other end of the mandrel the body 11 is provided with an externally taper threaded pin 25 for making a rotary shouldered connection with another drill string member, e.g. a tool joint box 27 on the lower end of a drill collar or a sub. The shoulder 29 provided by the mouth of the box 27 provides stop means to prevent axial motion of the roller assemblies relative to the mandrel in the direction toward the pin 25. When the box 27 is made up tight on pin 25 the roller assemblies are axially compressed against shoulder 23 and transmit torque between the shoulder 29 and shoulder 23 in the manner described in the aforementioned Garrett patent, and to some degree in the manner described in the aforementioned Tirapolsky et al. patent.

The outer peripheres of the roller assemblies may be provided with any suitable wear reducing means such as inserted tungsten carbide buttons, or hard facing bands, as is disclosed in the 1974–75 edition of the Composite Catalogue of Oilfield Equipment and Services at page 1,774 and in U.S. Pat. Nos. 3,667,817 (Kellner), 3,285,678 (Garrett & Crews), and 3,306,381 (Garrett & Moore). Suitable wear reducing means comprises a herringbone inlay of hard metal such as "Stude 6" as indicated at 30 on the upper part of the roller of each roller assembly and a helical pattern of flat faced protuberant tungsten carbide inserts 31 around the lower part thereof. Such means 30, 31 on roller assembly 19 is shown to be in contact with the wall 32 of the bore hole. The wall contacting portions of the other roller assemblies are displaced azimuthally from that of the adjacent roller assemblies by an angle $x$ equal to 360° divided by the number of roller assemblies. With three roller assemblies the wall contacting portions are spaced apart 120°. Orienting means for effecting this result will be described later on hereinafter. Any desired number of roller assemblies can be used, for example two through six or more roller assemblies.

ROLLER ASSEMBLY

Figure 2:
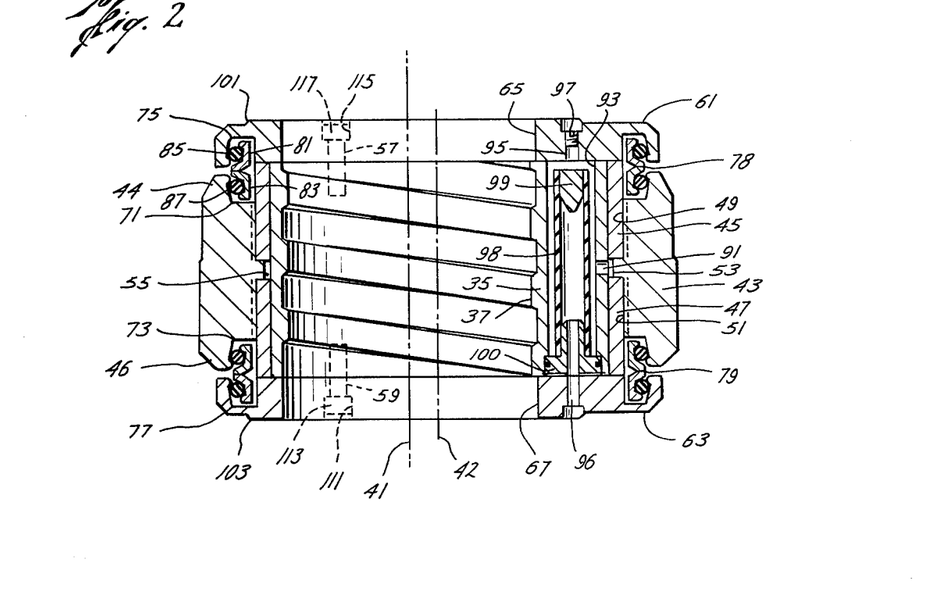
FIG. 2 is an axial section through one of the roller assemblies.

Referring now to FIG. 2, each roller assembly, e.g. 19, includes a journal 35 having a generally cylindrical bore in which there is a single lead thread 37 correlative to the thread 33 on the mandrel onto which it is screwed.

The outer periphery 39 of the journal is a smooth cylindrical surface eccentric to the axis of the bore of the journal and the axis 41 of the mandrel. The axis of the eccentric outer periphery of the journal is indicated at 42.

Rotatably mounted on journal 35 is generally cylindrical annular roller 43. Roller 43 is of about the same axial extent as journal 35 except for cylindrical cuffs 44, 46 at the upper and lower ends of the roller. Earth formation reducing means 31 on the outer periphery of the roller is concentric with journal axis 42.

Bushings 45, 47 of bronze or other suitable bearing material are received within cylindrical bores 49, 51 in the ends of the roller. The inner peripheries of the bushings are fitted over the outer periphery of the journal for rotation thereon. Bushings 45, 47 provide radial bearing means for the rollers cooperating with the journal 35 eccentrically rotatably mounting the roller on the reamer body.

Bushings 45, 47 may be press fitted or soldered in place within roller 43. The inner diameters of the bushings are smaller than the inner diameter of the mid-portion 53 of the inner periphery of roller 43. This leaves an annular space 55 between the roller and the journal which is filled with lubricating and cooling liquid such as oil.

Secured to the upper and lower ends of journal 35 by rings of cap screws or bolts 57, 59 (see also FIG. 3) are end plates 61, 63. The end plates are eccentrically apertured at 65, 67 to fit snugly around the mandrel. The outer peripheries of the end plates are of larger outer diameter than the journal, extending out over the inner portions of the ends of the roller adjacent the ends of bevelled cuffs 44, 46. The plates overlap the ends of the bushings 45, 47 and prevent axial motion of the roller 43 relative to the journal 35. The plates and bushings thus form thrust bearings.

The inner portions of the ends of the roller are provided with annular pockets 71, 73. The seal plates are provided with annular pockets 75, 77 registering with pockets 71, 73. Disposed within the upper pair of pockets 71, 75 is a suitable rotating seal means 78. A similar rotating seal means 79 is disposed in the lower pair of pockets 73, 77. Preferably, as shown, each such seal means is a seal made by the Caterpillar Tractor Company known in the art as a Caterpillar seal. Such a seal comprises a pair of flat faced metal bearing rings 81, 83 urged into contact by a pair of elastomeric toruses or O-rings 85, 87. The outer walls of the pockets in the end plates and roller and the outer peripheries of the bearing rings are tapered so that the O rings exert axial pressure on the bearing rings to cause a seal therebetween One bearing ring of each seal means remains stationary relative to the adjacent end plate and the other bearing ring turns with the adjacent roller.

Figure 3:
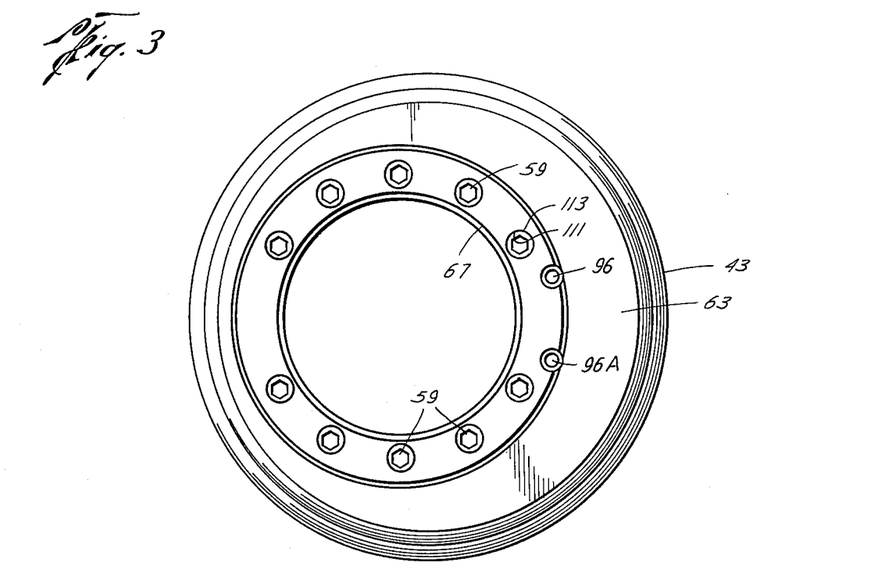
FIG. 3 is a plan view of one of the roller assemblies.

The clearance space between the end plates, roller, and journal, including space 55, sealed off by the seal means 78, 79 provide a reservoir for the lubricating and cooling liquid or oil. Radial and axial ports 91, 93 in the thickest part of the journal connect space 55 with fill port 95 in the upper end plate 61 which is closed by means of a screw plug 97. Axial port 93 is of large diameter providing a chamber in which is disposed a suitable volume compensator. The compensator comprises a flexible tube 98 closed at one end by plug 99 and mounted at the other end on a tubular nipple which is held in place in the roller by a split resilient ring 100. The volume compensator allows the oil in the reservoir to expand when heated, thereby preventing oil loss through the seal means 78, 79. The interior of the compensator is open to atmosphere through nipple 100 and port 96. If desired a second compensator can be used, breathing through port 96A (FIG. 3). With respect to volume compensation generality, compare the disclosure of United States Pat. Nos. 3,413,045 to Wohlfeld and 3,463,270 to Lundstrom et al.

The end plates 61, 63 are provided with annular bosses 101, 103. These bosses engage like bosses on the end plates of adjacent roller assemblies, except the lowermost boss engages shoulder 23 on the reamer body and the uppermost boss engages shoulder 29 formed by the lower end of the tool joint box 27. It is through these bosses that most of the torque is transmitted to and through the roller assemblies from shoulder 23 to shoulder 29 when the reamer is in use, only a small fraction of the torque being transmitted through the threads of box 25 to the reamer body.

It will be noted that the lower end plate 63 of each roller assembly is provided with countersink bores 111 which have depths greater than the lengths of the heads 113 of the bolts or cap screws 59 received therein.

The upper end plate 61 of each roller assembly is similarly provided with countersink bores 115 which have depths greater than the lengths of the heads 117 of the bolts or cap screws 59 received therein. When the bolts are in place the heads of the bolts do not protrude beyond the plate and do not interfere with torque transmission through bosses 101, 103.

ROLLER ASSEMBLY ORIENTATION

Each of the roller assemblies 15, 17, 19 is of the same length and has a length sufficient precisely to accommodate one or more full turns of the mandrel thread 33 plus 120 degrees. More generally stated each roller assembly length is sufficient to accommodate mandrel thread length equal to $(n)(360) + (360)/(r)°$ wherein $n$ is an integer and $r$ is the number of roller assemblies and roller assembly length is measured from boss 101 to boss 103. This will cause each journal to be displaced azimuthally from adjacent journals by $(360)/(r)°$, or 120° apart in the example shown in the drawing. For example, the position of each journal can be described with reference to the plane of its common eccentric diameters, that is, the diameters passing through both its bore axis 41 and the axis 42 of its outer periphery. By the prescribed construction the roller assemblies are positioned with the planes of the common eccentric diameters of their journals disposed 120 degrees apart. The lines of contact of the three roller assemblies with the wall 32 of the bore hole are likewise positioned 120° apart.

The length of each roller assembly is equal to $(p)(n) + (p)(x)/360$ where $p$ is the thread lead, $n$ is an integer, and $x$ is the azimuthal spacing in degrees of the plane of the common eccentric diameters of the roller assembly relative to that of an adjacent roller assembly, $x$ being equal to $360/r$ if the roller assemblies are all equally azimuthally spaced.

If desired, the stabilizer could be provided with more or less than three roller assemblies. Also the roller assemblies can be of any desired length to effect desired azimuthal positioning of their journals. Normally equiazimuthal positioning is desired but unequal angular spacings can be achieved if desired. Also, repetitive configurations can be employed such as a stabilizer with six roller assemblies in groups of three with the three upper rollers aligned with those below or midway therebetween. The principle of using roller assemblies having a length of $(n+x)(360)°$ where $n$ is an integer and $x$ is the desired azimuthal spacing can not only be used with single lead threads but can also be employed with multiple lead threads, e.g. of the type described in the aforementioned Young application.

Figure 4:
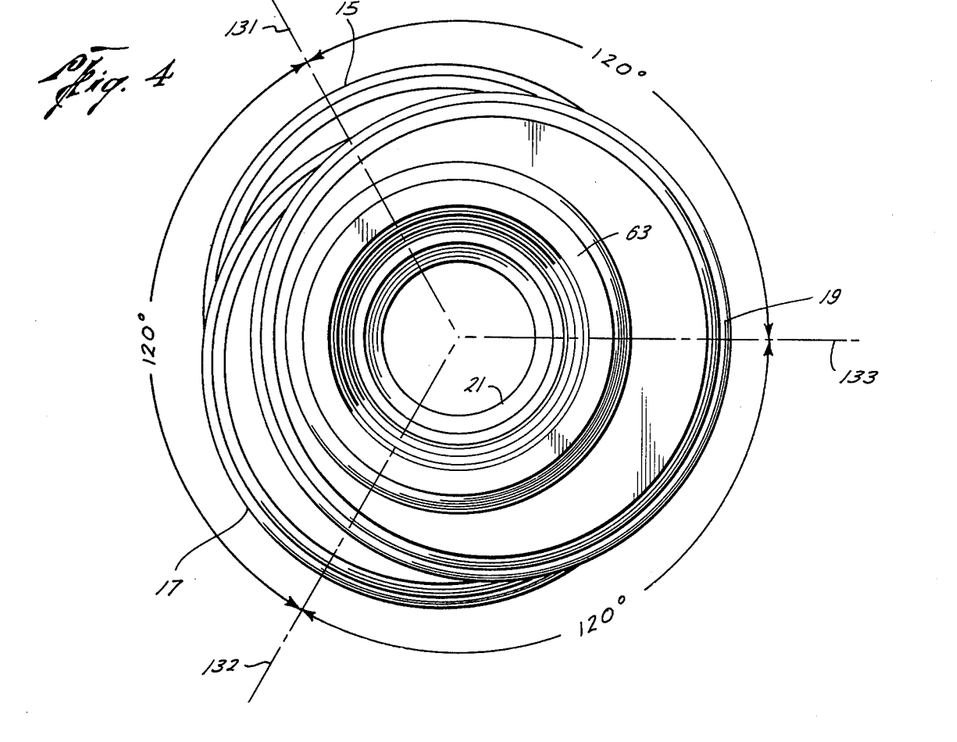
FIG. 4 is a bottom view of the stabilizer.

Referring now to FIG. 4, the result of the above described construction for orienting the roller assemblies is shown. The planes of the common eccentric diameters 131, 132, 133 for the three roller assemblies 15, 17, 19 are seen to be azimuthally spaced apart by 120°, providing for three equally spaced points (or lines) of contact with the side of a bore hole in which the stabilizer is used.

Figure 5:
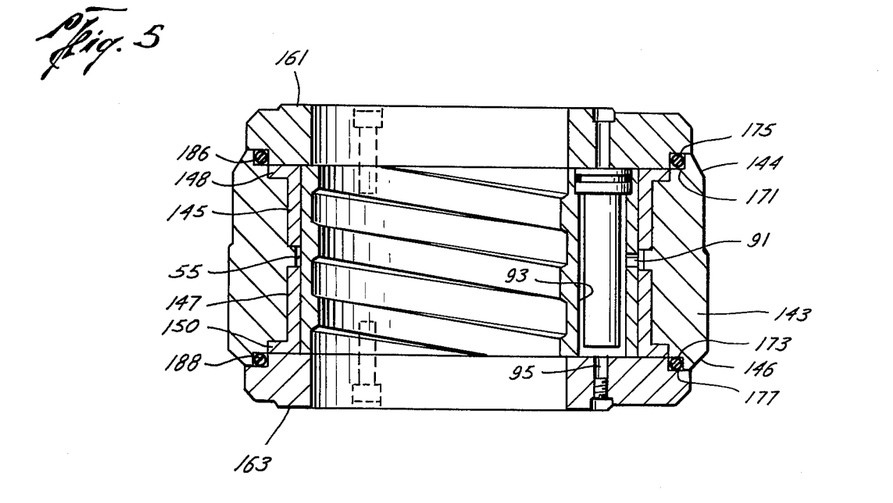
FIGS. 5-7 are views similar to FIG. 2 showing modified forms of roller assemblies.

Referring now to FIG. 5, there is shown a modified form of roller assembly similar to that of FIG. 2 but employing slightly different bearings and seals. The bearing bushings 145, 147 are provided with end flanges 148, 150 providing greater contact area with the end plates 161, 163. This is to enhance the axial thrust capacity of the bearings. The ends of cuffs 144, 146 on the ends of the roller 143 are in sliding contact with annular rabbets or pockets 175, 177 around the edges of end plates 161, 163. O rings 186, 188 are received in the annular closed spaces defined by rabbets 175, 177 and opposing annular rabbets or pockets 171, 173 in the ends of the roller. O rings 186, 188 in cooperation with the sliding contacting surfaces of the end plates, bushings, and roller, provide means sealing the oil chamber of the roller assembly. The oil chamber includes the various clearance spaces plus the annular space 55 and the ports 91, 93, 95 as in the previously described embodiment (FIG. 2).

Figure 6:
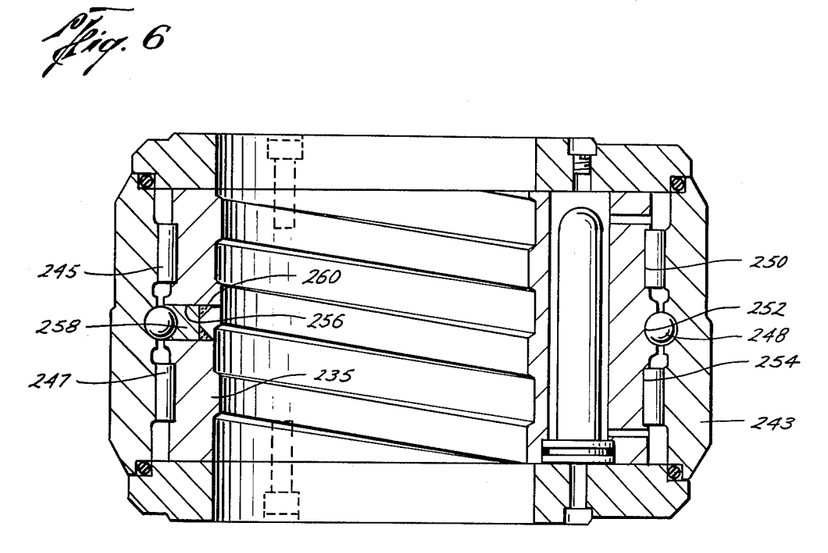

FIG. 6 shows a roller assembly similar to that shown in FIG. 5 but employing different bearing means. In place of the bushings 145, 147 with thrust flanges 148, 150 the construction shown in FIG. 6 employs two sets of roller bearings 245, 247 and a set of ball bearings 248 to take thrust. This construction is similar to the RBR type of bearing for Smith Tool rock bits described on page 4576 of the 1974–75 Composite Catalogue of Oil Field Equipment and Services. The rollers and balls are not premounted in races but instead the rollers are placed directly in the annular grooves 250, 252, 254 in the journal 235 before the roller 243 is slipped over them, and the locking balls 248 are introduced through a radial fill passage 256 in journal 235; the passage is later closed with a filler plug 258 held in place by welding or by a screw plug 260. This same opening or a separate lubrication port leading to the reservoir defined by the O ring bearing seals 186, 188 can be used to introduce grease or oil to the bearings in the manner described on page 4577 of the 1974–75 edition of the Composite Catalogue of Oil Field Equipment and Services, the disclosure of which, together with the aforementioned page 4576 is incorporated herein by reference. No volume compensator is shown in this modification although one could be employed if desired.

Figure 7:
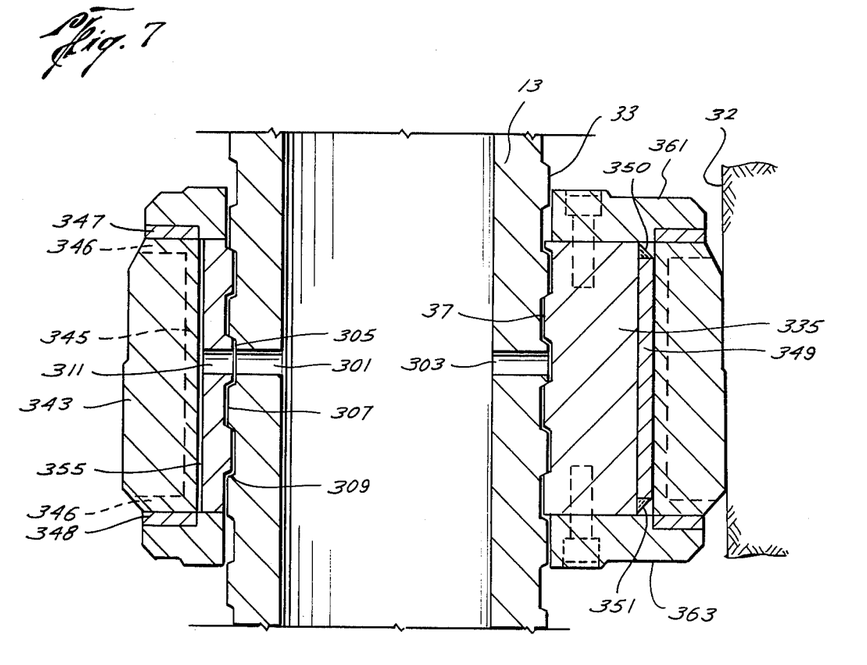

Referring now to FIG. 7, there is shown a roller assembly and the adjacent portions of the mandrel, which are similar to the construction shown in FIGS. 1, 2, 5 and 6 except as to the bearing and seal construction. Like parts are given the same reference numbers; slightly modified parts bear similar numbers plus 300.

In this modification, in place of bushings 145, 147 provided in roller 143 in the FIG. 5 embodiment, the inner periphery and ends of the roller 343 are carburized, as indicated at 345, 346. The portions of end plates 361, 363 adjacent the carburized ends of the roller are provided with washer-shaped inserts or thrust facings 347, 348 made of hard steel. For example facings 347, 348 may be made of bearing race material such as M-2 tool steel.

Centered on its loaded side, journal 335 is provided with a 135 degree load strip 349. Load strip 349 is mounted on the outer periphery of the journal as shown, and may be held in place by screws or by welding as at 350, 351 or by other suitable means. If strip 349 is welded to the journal, the journal should be made of easily welded steel. A suitable material for strip 349 would be Haynes HC-1 or 9620 or 9310 or other easily welded hardenable steel. An air gap 355 is left between the journal 335 and roller 343 at the unloaded side of the journal opposite from strip 349. Although the roller 343 and journal 345 have relative rotation when the reamer is in use, the lateral pressure on the roller due to its contact with well bore 32 keeps the roller in contact with the thickest part of the eccentric journal so that the inner periphery of the roller contacts the journal over only about ⅜ of the journal's outer periphery. That is why a 135° load strip provides adequate wear protection for the journal. The construction is somewhat similar to the bearing of a railroad car axle in which the wear bushing is disposed at only the top side of the axle. See page 52 of the July 1975 issue of Scientific American. However in that case, it is the bearing which has a wear surface extending only part way around its circumference, rather than the journal as in the present case. See also page 59 of the same reference. The entire article is incorporated herein by reference.

Although the roller contacts only a portion of the outer periphery of the journal when the roller is in use, the carburized ends 345 of the roller slide over the whole adjacent surfaces of the end plate facings 347, 348, which serve as thrust bearings.

As previously stated, in the FIG. 7 construction there are no bearing seals. Drilling fluid, e.g. air, bled from the mandrel through radial ports 301, 303 is used for cooling the bearing. From port 301, 303 air enters the helical spaces 305, 307 between the crests and valleys of journal thread 37 and mandrel thread 33. Spaces 305, 307 are continuously interconnected by the helical space 309 between the unloaded flanks of the threads. Preferably the ports 301, 303 are positioned so as to open at the middle of a mandrel thread valley and crest respectively rather than at a thread flank. From the helical interthread space 305, 307, 309 air enters into one or more radial ports 311 in the journal. From port 311 the air dumps into air gap space 313 between the journal 335 and rollers 343. The air ultimately escapes through the spaces between roller 43 and end plates 361, 363 after cooling and cleaning the journal and bearing surfaces. Port 311 is positioned in the portion of the journal that is radially unloaded when the reamer is in use, i.e., the thinner portion of the journal. Preferably the port 311 is positioned on the common eccentric diameter where it will be directly opposite from the center of the load imposed on the journal by roller 43 when it contacts the bore hole.

Preferably the port 311 is positioned to be in axial alignment with port 301, as shown; and disposed midway between end plates 361, 363. The preferred location of port 311 requires proper azimuthal positioning of threads 33, 37 so that when each journal is fully made up on the mandrel 13 the ports 311, 301 will be aligned. Reliance upon air flow through the helical interthread space 305, 307, 309 is then unnecessary. In fact the threads 33, 37 could then be designed for very close fit of valley and crest to relieve the thread flanks of radial load.

With journal port 311 aligned with mandrel port 301, mandrel port 303 serves primarily only to minimize stress concentration in the mandrel due to port 301.

The above described air cooled stabilizer bearing construction is to be compared with the air cooled reamer and bit bearing constructions described in U.S. Pat. Re. number 27,781 and the references cited thereto. See also U.S. Pat. Nos. 2,861,780-Butler, 3,303,900-Kloesel et al, 3,306,379-Kloesel et al, and 3,659,663-Dysart.

With respect to all of the above described embodiments of the invention some consideration needs to be given to the specific form of the thread by which the rollers are oriented relative to the mandrel. Preferably the thread is a right hand thread, as shown in FIGS. 1–7 so that when the stabilizer is rotated in the conventional clockwise direction the mandrel will tend to move down relative to the rollers, i.e., tend to unscrew the rollers. This will keep them from jamming up against the mandrel shoulder 23 so tightly as to be difficult to remove for replacement. Preferably the helix angle of the threads 33, 37 is between less than 8° (locking) and 16° (not locking) e.g. 12°, whih may be called semilocking. This results in the rollers making up tight on the mandrel without any play but permits easy disassembly, e.g. with a sharp hammer blow.

It is also to be noted that the threads 33, 37 have sufficient flank clearance so that the journals can be axially compressed by box 27 against shoulder 23 sufficiently to insure a torque transmitting rotary shouldered connection. When the reamer is fully assembled the journals are in axial compression throughout their lengths between shoulders 23 and 29 but may be slightly more compressed at their lower ends adjacent the first turn of thread 33 where the first turn wedges against thread 37 and presses the journal axially downward toward shoulder 23 or the plate 61 of the adjacent roller assembly next below it. With respect to thread loading see U.S. Pat. No. 2,636,753 to Griffin.

The preferred thread is, as shown, a shallow, flat crested, wide thread, with moderately sloping, e.g. 45°, thread flanks.

Figures 8, 9, 10:
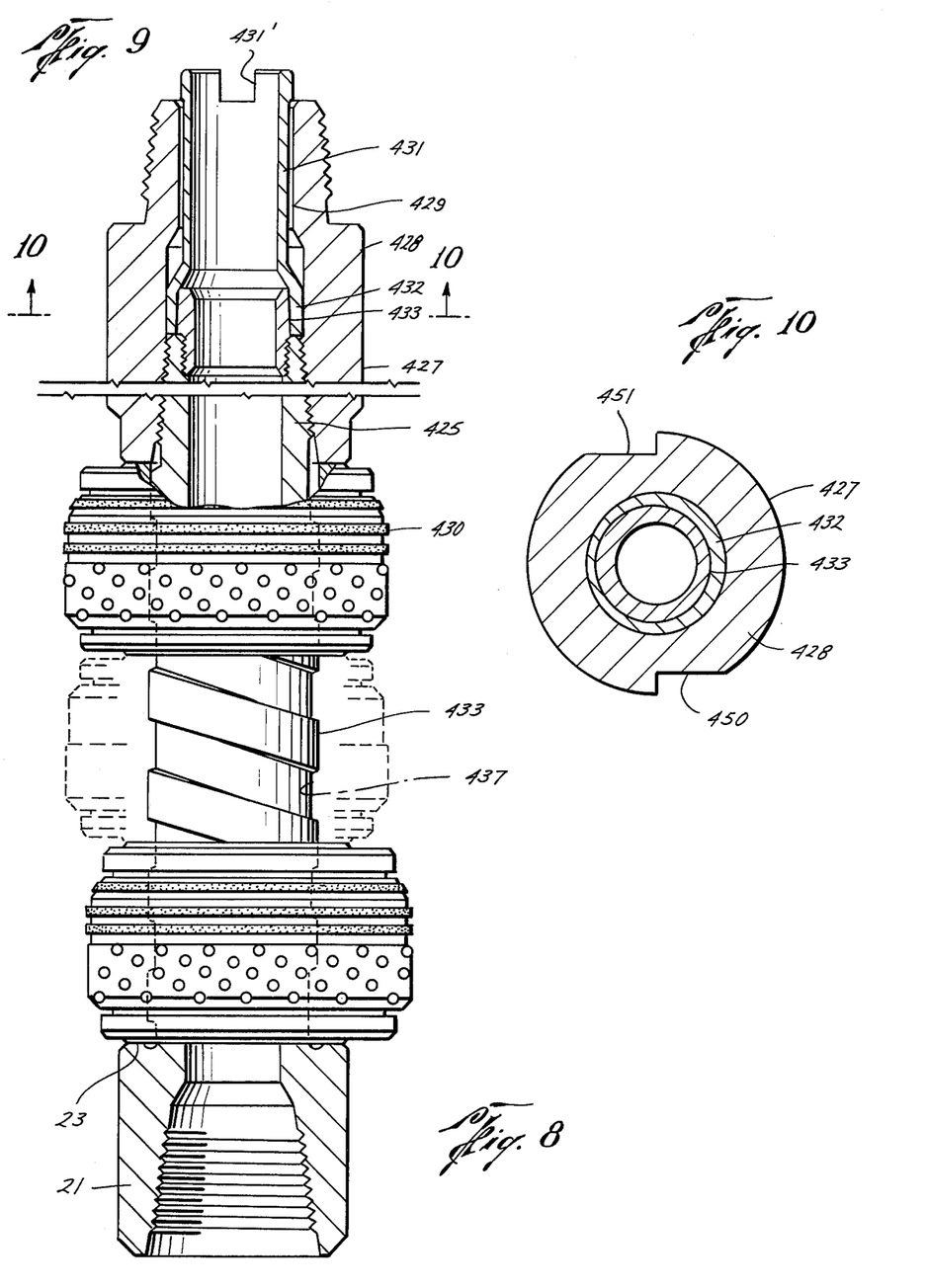
FIGS. 8 and 9 together form a view similar to FIG. 1 showing modified forms of stabilizer.
FIG. 10 is a transverse section taken at plane 10—10 of FIG. 9.

Referring now to FIGS. 8, 9, and 10 there is shown a modification which is the same as the construction of FIG. 1 except that left hand threads 433, 437 are employed on the mandrel and journals. This will cause the roller assemblies to be screwed more tightly against mandrel shoulder 23 as drilling proceeds. With this construction a non-locking helix angle, i.e., greater than 16°, should be employed to facilitate disassembly when it is desired to replace the roller assemblies (or body) when same wears out.

FIG. 8 also illustrates a slightly modified wear reducing means arrangement on the roller assemblies. Instead of the herringbone pattern of hard metal inlay 30 shown in FIG. 1, continuous circular bands of hard metal inlay 430 are employed.

Finally, FIGS. 9 and 10 illustrate a form of locking device by means of which the box 427 may be secured to mandrel pin 425. In this case box 427 is formed on the lower end of a sub 429 which has an enlarged bore 429 in its upper (pin) end. Bore 429 receives lock tube 430. The tube is provided with diametrically opposed wrench slots 431. The lower end of tube 430 is provided with an eccentrically internally tapered smooth box 432 received in an extension of the inner bore of box 427. Box 432 fits over the eccentrically externally tapered smooth pin 433 whose lower end is screwed into the upper end of mandrel pin 425. Turning lock tube 430 a fraction of a revolution wedges the box 432 between the inner periphery of the sub and the outer periphery of pin 433 carried by the mandrel. The sub and mandrel are thus locked together. This locking means could also be employed with the FIG. 1 construction if desired.

FIG. 10 not only shows clearly the eccentricities of pin 433 and box 432 but also shows wrench flats 450, 451 on sub 423 for facilitating make up of the stabilizer with an adjacent drill string member, e.g. a drill collar. If desired, similar flats can be provided on mandrel box 21. Such wrench flats can also be employed in the FIG. 1 construction.

Although the subject invention is intended for use as a stabilizer, e.g. for blast hole drilling, it is of more general utility, and its principles may also be employed for reamers. For this reason the invention may be referred to in the claims as a Wall Contacting Tool While preferred embodiments of the invention have been shown and described, further modifications can be made by one skilled in the art without departing from the spirit of the invention.

I claim:

1. Wall contacting tool comprising a mandrel having a plurality of eccentric roller assemblies disposed in tandem along the length of the mandrel, said mandrel and each of said roller assemblies being provided with cooperative screw thread means to position the assemblies with predetermined azimuthal orientation of the planes of their common eccentric diameters, the length of each roller assembly being equal to $(p)(n) + (p)(x)/360$ where $p$ is the thread lead, $n$ is an integer, and $x$ is the azimuthal spacing in degrees of the plane of the common eccentric diameters of the roller assembly relative to that of an adjacent roller assembly.

2. Wall contacting tool according to claim 1 in which $x$ has the same value for each roller assembly.

3. Wall contacting tool according to claim 2 in which $x$ is equal to $(360/r)°$ where $r$ is the number of roller assemblies.

4. Wall contacting tool according to claim 3 wherein each of the roller assemblies has the same length.

5. Wall contacting tool according to claim 4 wherein the screw thread means has a single lead.

6. Wall contacting tool according to claim 5 wherein said thread means is right-hand and said mandrel is provided with right-hand screw thread connection means at each end for connecting with other drill string members.

7. Wall contacting tool according to claim 6 in which the helix angle of said thread means is between 6° and 18°.

8. Wall contacting tool according to claim 5 in which there are stop means at the ends of the mandrel limiting axial movement of the roller assemblies relative to the mandrel and said screw thread means has a helix angle that is semi-locking.

9. Wall contacting tool according to claim 5 including stop means at the ends of the mandrel limiting axial movement of the roller assemblies relative to the mandrel and in which one of said stop means is provided by an integral shoulder on the mandrel and the other is provided by a shoulder on a retention member screwed onto the mandrel, and releasable locking means to prevent said retention member on the mandrel from being unintentionally unscrewed during use of the wall contacting tool.

10. Wall contacting tool according to claim 5 wherein said thread means is left-hand and said mandrel is provided with right-hand screw thread connection means at each end for connection with other drill string members.

11. Wall contacting tool according to claim 10 in which the helix angle of said thread means is greater than 16°.

12. Wall contacting tool according to claim 10 in which there are stop means at the ends of the mandrel limiting the axial movement of the roller assemblies relative to the mandrel and said screw thread means has a helix angle that is locking.

13. Wall contacting tool comprising a mandrel having a plurality of eccentric roller assemblies disposed in tandem along the length of the mandrel, said mandrel and each of said roller assemblies being provided with cooperative screw thread means to position the assemblies with predetermined aximuthal orientation of the planes of their common eccentric diameters, the length of each roller assembly being equal to $(p)(n) + (p)(x)/(360)$ where $p$ is the thread lead, $n$ is an integer, and $x$ is the azimuthal spacing in degrees of the plane of the common eccentric diameters of the roller assembly, said mandrel being tubular and each roller assembly including a journal and a roller rotatably mounted thereon, said screw thread means including a thread on the mandrel and a thread on each journal, said journal threads being on the inner peripheries of the journals which are screwed onto the thread on the mandrel; said mandrel having fluid passages extending from the inner periphery of the mandrel to the outer periphery of the mandrel between the ends of the journals of each roller assembly, each journal having a fluid passage extending from the innver periphery of the journal to the outer periphery of the journal adjacent the inner periphery of the roller, there being fluid passage clearance between the inner periphery of the roller and the outer periphery thereof, each journal having an outer periphery eccentric to its inner periphery, said fluid passage in each journal being in the thinner half of said journal, said fluid passage in each journal being a port aligned with the plane of the common eccentric diameters of the journal, said fluid passages in the mandrel being ports aligned with said journal ports, said mandrel ports being radial ports, and including stress reducing radial ports in the mandrel diametrically opposite to the fluid passage ports.

14. Wall contacting tool comprising a mandrel having a plurality of eccentric roller assemblies disposed in tandem along the length of the mandrel, said mandrel and each of said roller assemblies being provided with cooperative screw thread means to position the assemblies with predetermined azimuthal orientation of the planes of their common eccentric diameters, the length of each roller assembly being equal to $(p)(n) + (p)(x)/(360)$ where $p$ is the thread lead, $n$ is an integer, and $x$ is the azimuthal spacing in degrees of the plane of the common eccentric diameters of the roller assembly relative to that of an adjacent roller assembly, said screw thread means having a single lead, each roller assembly including an eccentric journal and a roller rotatably mounted thereon, and said screw thread means including a thread on the mandrel and a thread on each journal, said journal threads being on the inner peripheries of the journals which are screwed onto the mandrel thread, the outer periphery of the thicker half of each journal being provided with a wear strip over a segment of 135° plus or minus 45°, the inner periphery of each roller being provided with a hardened bearing surface.

15. Wall contacting tool according to claim 14 in which the wear strip is centered on the plane of the common eccentric diameters of the journal.

16. Wall contacting tool according to claim 15 in which each roller assembly further includes a thrust plate at each end of the journal extending out over the ends of the roller, each thrust plate being provided with an annular facing of bearing material, the ends of the roller adjacent said facings being hardened.

17. Wall contacting tool comprising a mandrel having a plurality of eccentric roller assemblies disposed in tandem along the length of the mandrel, said mandrel and each of said roller assemblies being provided with cooperative screw thread means to position the assemblies with predetermined azimuthal orientation of the planes of their common eccentric diameters, the length of each roller assembly being equal to (*p*) (*n*) + (*p*) (*x*)/(360) where *p* is the thread lead, *n* is an integer, and *s* is the azimuthal spacing in degrees of the plane of the common eccentric diameters of the roller assembly, said screw thread means having a single lead, stop means at the ends of the mandrel limiting axial movement of the roller assemblies relative to the mandrel, one of said stop means being provided by an integral shoulder on the mandrel and the other being provided by a shoulder on a retention member screwed onto the mandrel, said roller assemblies being compressible between said shoulders sufficient to transmit torque between said shoulders when said wall contacting tool is assembled, said screw thread means including threads on said mandrel and roller assemblies having flank clearance to allow such compression, and releasable locking means to prevent said retention member on the mandrel from being unintentionally unscrewed during use of the wall contacting tool, said retention member being tubular and said locking means including a pin secured to the upper end of said mandrel, said pin having an outer periphery eccentric to the mandrel axis, said locking means further including a tube extending coaxially within said retention member and having a box engaged with said pin, said box having an outer periphery that is eccentric to the axis of said tube, said outer periphery of said tube box being in engagement with the inner periphery of said retention member.

18. Wall contacting tool according to claim 17 in which said box and pin are correlatively tapered, the box flaring toward its mouth.

19. Wall contacting tool according to claim 18, said retention member being a sub having a threaded box at its end that is screwed onto said mandrel, said mandrel being provided with a threaded pin at its end to which said retention member is screwed on, said pin of said locking means being screwed into said mandrel pin, said retention means box having a continuation of its bore to receive said box of said locking means.

20. Wall contacting tool comprising a mandrel having a plurality of eccentric roller assemblies disposed in tandem along the length of the mandrel, said mandrel and each of said roller assemblies being provided with cooperative screw thread means to position the assemblies with predetermined azimuthal orientation of their common eccentric axes, the length of each roller assembly being equal to (*p*) (*n*) + (*p*) (*x*)/(360) where *p* is the thread lead, *n* is an integer, and *x* is the azimuthal spacing in degrees of the common eccentric axis of the roller assembly relative to that of an adjacent roller assembly, said screw thread means having a single lead, each roller assembly including an eccentric journal and a wall contacting roller rotatably mounted thereon, end plates secured to the journal overlapping the ends of the roller, and O ring sealing means between each end plate and roller forming a lubricant chamber between each roller and journal.

21. Wall contacting tool according to claim 20 including wear bushings received in each end of each roller, said bushings each including a sleeve portion for engagement with the journal and a flange portion for engagement with the adjacent end plate.

22. Wall contacting tool according to claim 20 including annular grooves around each journal in which are disposed bearing rollers forming two rings of bearing rollers, one at each end of the journal, and correlative annular grooves around each journal and inside the wall contacting roller in which are received interlocking ball bearings.

23. Wall contacting tool according to claim 22 including a grease port in each tool roller communicating with said ball bearings and closed after assembly.

24. Wall contacting tool comprising a mandrel having a plurality of eccentric roller assemblies disposed in tandem along the length of the mandrel and including orienting means to position the assemblies with predetermined azimuthal orientation of the plane of their common eccentric diameters relative to each other, said mandrel being tubular and each of said roller assemblies including a sleeve-shaped journal whose outer periphery is eccentric to its inner periphery and a roller rotatably mounted on the outer periphery of the journal, each journal being mounted on the mandrel, said mandrel having a fluid passage means extending from the inner periphery of the mandrel to the outer periphery of the mandrel between the ends of the journal of each roller assembly, each journal having a fluid passage extending from the inner periphery of the journal to the outer periphery of the journal adjacent the inner periphery of the roller, there being fluid communication between said journal fluid passages and said fluid passage means in the mandrel, and exhaust fluid passage means between the inner periphery of each roller and the outer periphery thereof, said orienting means comprising means to position each journal in predetermined azimuthal position about the axis of the mandrel, said fluid passage means in the mandrel comprising at least one fluid passage in register with each journal fluid passage.

25. Wall contacting tool comprising a mandrel having a plurality of eccentric roller assemblies disposed in tandem along the length of the mandrel and including orienting means to position the assemblies with predetermined azimuthal orientation of their common eccentric diameters relative to each other, each of said roller assemblies including a sleeve shaped journal whose outer periphery is eccentric to its inner periphery and a roller rotatably mounted on the outer periphery of the journal, each journal being mounted on the mandrel, each journal having a wear strip on its outer periphery positioned so that the plane of the common eccentric diameters of the journal passes through the wear strip, the wear strip being on the thicker half of the journal.

26. Wall contacting tool according to claim 25, each roller assembly including end plates secured to the ends of the journals with annular facings of bearing material over each plate adjacent the ends of the rollers, said facings providing thrust bearings for the rollers.

27. Wall contacting tool according to claim 26 wherein the mandrel is tubular and including fluid passage means extending from the interior of the mandrel through each journal to the space in between the journal and roller opposite from said wear strip and exhausting through the clearance between each roller and said facings.

28. Wall contacting tool according to claim 27 wherein said orienting means includes protuberant means extending along the length of the mandrel engaging correlative recess means extending along the inner periphery of each journal to effect desired azimuthal positioning of said roller assemblies and to align the portion of said fluid passage means in the mandrel with that portion in each journal.

29. Wall contacting tool according to claim 25 including fluid passage means extending from the interior of the mandrel through each journal to adjacent the inner periphery of each roller, said orienting means positioning each journal azimuthally about the mandrel axis and aligning the portion of said fluid passage means in the mandrel with that portion in each journal.

30. Wall contacting tool according to claim 29 wherein said orienting means includes screw threads on said mandrel and journals and the portion of said fluid passage means in the mandrel connects with that in each journal via the clearance between the threads.

31. Wall contacting tool comprising a mandrel having a plurality of eccentric wall contacting roller assemblies disposed in tandem along the length of the mandrel, each roller assembly including a journal disposed about the mandrel and a roller rotatably mounted on the journal, each journal being a sleeve whose outer periphery is eccentric to its inner periphery, orienting means positioning each journal with the plane of its common eccentric diameters in desired azimuthal position relative to the other journals, each roller assembly further including apertured end plates secured one to each end of the journal with the aperture of each plate coaxial with the mandrel, the outer periphery of each end plate being eccentric, the planes of the common eccentric diameters of each end plate being oriented the same as that of the journal, O ring seal means between each end plate and roller forming a lubricant chamber between each journal and roller, annular groove means around each journal in which are disposed bearings rollers forming annular roller bearing means between the journal and associated wall contacting roller, and correlative annular grooves around each journal and inside the associated wall contacting roller in which are received interlocking ball bearings preventing relative axial movement of the wall contacting roller and journal.

32. Wall contacting tool according to claim 31 wherein said orienting means includes said mandrel being exteriorly threaded and each journal having thread means on its inner periphery whereby the journal is screwed onto the mandrel into a predetermined azimuthal position about the mandrel, said end plates extending out over the ends of the journals to take axial thrust loads imposed on the wall contacting roller and relieve said interlocking balls of at least part of such loads.

* * * * *

UNITED STATES PATENT OFFICE
CERTIFICATE OF CORRECTION

Patent No. 4,102,552          Dated July 25, 1978

Inventor(s) Jackson M. Kellner

It is certified that error appears in the above-identified patent and that said Letters Patent are hereby corrected as shown below:

Column 3, line 15, change "peripheres" to --peripheries--.

Column 4, line 28, after "between" insert -.-.

Column 8, line 5, change "whih" to --which--.

Column 8, line 69, after "Tool" insert -.-.

Column 10, line 16, change "innver" to --inner--.

Signed and Sealed this

Twenty-fourth Day of April 1979

[SEAL]

Attest:

RUTH C. MASON
Attesting Officer

DONALD W. BANNER
Commissioner of Patents and Trademarks